US010677703B2

(12) United States Patent
Gao et al.

(10) Patent No.: US 10,677,703 B2
(45) Date of Patent: Jun. 9, 2020

(54) METHODS AND SYSTEMS FOR DETERMINING FLUID DENSITY BY DISTRIBUTED ACOUSTIC SENSING

(71) Applicant: Halliburton Energy Services, Inc., Houston, TX (US)

(72) Inventors: Li Gao, Katy, TX (US); Christopher L. Stokely, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/326,965

(22) PCT Filed: Oct. 21, 2016

(86) PCT No.: PCT/US2016/058266
§ 371 (c)(1),
(2) Date: Feb. 21, 2019

(87) PCT Pub. No.: WO2018/075075
PCT Pub. Date: Apr. 26, 2018

(65) Prior Publication Data
US 2019/0212238 A1 Jul. 11, 2019

(51) Int. Cl.
*G01N 9/24* (2006.01)
*E21B 49/08* (2006.01)
(Continued)

(52) U.S. Cl.
CPC ............ *G01N 9/24* (2013.01); *E21B 47/101* (2013.01); *E21B 49/08* (2013.01); *G01N 9/002* (2013.01);
(Continued)

(58) Field of Classification Search
CPC ......... G01N 9/24; E21B 49/08; E21B 47/065; E21B 2049/085
See application file for complete search history.

(56) References Cited

U.S. PATENT DOCUMENTS 5,218,197 A * 6/1993 Carroll .................. G01L 9/0007
250/227.16
5,965,824 A * 10/1999 Kishiro .................. G01F 1/849
73/32 A (Continued)

FOREIGN PATENT DOCUMENTS

WO 2014066102 A1 5/2014
WO 2016109447 A1 7/2016

OTHER PUBLICATIONS

International Search Report and Written Opinion dated Jul. 3, 2017 for PCT Application No. PCT/US2016/058266 filed Oct. 21, 2016.

*Primary Examiner* — David Z Huang
(74) *Attorney, Agent, or Firm* — Chamberlain Hrdlicka (57) ABSTRACT

Methods for determining a density of a fluid are provided. The method can include passing the fluid through a conduit, measuring a vibration of the conduit by distributed acoustic sensing via a fiber optic cable coupled to the conduit, and generating a vibrational signal indicative of the measured vibration. At least a portion of the vibration of the conduit can be produced by the fluid passing therethrough. The method can also include measuring a temperature of the conduit and generating a temperature signal indicative of the temperature. The method can further include calculating the density of the fluid passing through the conduit by using the vibrational signal and the temperature signal.

20 Claims, 3 Drawing Sheets

(51) Int. Cl.
*G01N 9/00* (2006.01)
*E21B 47/10* (2012.01)
*E21B 47/06* (2012.01)

(52) U.S. Cl.
CPC ....... *E21B 47/065* (2013.01); *E21B 2049/085* (2013.01); *G01N 2009/006* (2013.01)

(56) References Cited

U.S. PATENT DOCUMENTS

| | | | |
|---|---|---|---|
| 6,655,457 B1* | 12/2003 | Dybdahl | E21B 33/124 166/250.17 |
| 2002/0178803 A1 | 12/2002 | Pelletier et al. | |
| 2013/0180330 A1* | 7/2013 | Gao | G01N 9/32 73/32 A |
| 2016/0108729 A1 | 4/2016 | Li et al. | |
| 2019/0003499 A1* | 1/2019 | Logan | F16B 2/06 |

* cited by examiner

METHODS AND SYSTEMS FOR DETERMINING FLUID DENSITY BY DISTRIBUTED ACOUSTIC SENSING

CONTEXT

This section is intended to provide relevant contextual information to facilitate a better understanding of the various aspects of the described embodiments. Accordingly, it should be understood that these statements are to be read in this light and not as admissions of prior art.

It is often important to be able to measure the density of fluids passing through a pipe in a variety of fields, including oil and gas industries, chemical processing and handling, food and beverage processing, and other fields. During oil and gas exploration operation, it is often desirable to have knowledge of the density of fluid being pumped into a well or fluid being produced out of a well. For example, precise measurement of the density of sand-laden fluid can be used to infer sand content. One type of fluid density sensor that can be used downhole is a radioactive density sensor. However, the radioactive density sensors may not be desirable due to the needed radioactive source. Therefore, it will be appreciated that improvements are continually needed in the field of methods for determining fluid density.

BRIEF DESCRIPTION OF THE DRAWINGS

For a detailed description of the embodiments of the invention, reference will now be made to the accompanying drawings in which.

DETAILED DESCRIPTION

In one or more embodiments, methods and systems for determining the density of a fluid are provided. At a time the density of the fluid is to be determined, the fluid can be passed or flowed through a channel within a pipe or other conduit and one or more vibrations of the conduit can be measured by distributed acoustic sensing (DAS) via a fiber optic cable coupled to the outer or inner surface of the conduit. One or more vibrational signals indicative of the vibration can be generated and used to determine the density of the fluid. In one or more examples, at least a portion of the vibration of the conduit can be a flow induced vibration that can be produced by the fluid passing through the channel. In other examples, at least a portion of the vibration of the conduit can be a shock induced vibration that can be produced by one or more alternative sources, such as a vibrational unit coupled to the conduit.

At the time the density of the fluid is to be determined, the method can also include measuring one or more temperatures of the conduit, such as the temperature of the outer surface of the conduit. One or more temperature signals indicative of the measured temperature can be generated and used to determine the density of the fluid. In one or more examples, the temperature of the conduit can be measured by distributed temperature sensing (DTS) via the fiber optic cable coupled to the outer or inner surface of the conduit. In other examples, the temperature of the conduit can be measured by single-point temperature sensing via one or more temperature sensor units coupled to the outer or inner surface of the conduit and/or at least partially disposed in the channel of the conduit.

In one or more embodiments, the method can include adjusting, at the time the density of the fluid is to be determined, a model of the conduit using the vibrational signal and the temperature signal to calculate the density of the fluid passing through the channel. The method can also include calculating a Young's modulus of a conduit material contained in the conduit to adjust the model of the conduit. For example, the model can include solving the following equation for the density of the fluid ($\rho_F$):

$$\rho_F = \frac{E(T) I \beta^4}{\pi a^2 \omega^2} - \frac{b^2 - a^2}{a^2} \rho_P,$$

where $\rho_P$ is the density of the conduit material; a is the inner radii of the conduit; b is the outer radii of the conduit; E(T) is the Young's modulus of the conduit material as a function of the temperature of the conduit; I is the area moment of inertia of the conduit; $\omega$ is the angular frequency of the conduit; and $\beta$ is a variable of the boundary conditions of the conduit.

The variable of the boundary conditions for the conduit model can be solved for either $\beta$ or $\beta^4$. In one or more examples, the model can further include solving the following equation for $\beta$:

$$\cos(\beta L) \cos h(\beta L) = 1,$$

where L is the distance between the nodes of the first mode obtained from the DAS data. For example, the distance between the nodes of the first mode can be the distance between the first and second points along the length of the conduit.

In other examples, the model can further include solving for density $\rho_F$ after $\beta$ has been determined in the following equation:

$$\beta^4 = \frac{(m_P + m_F) \omega^2}{E(T) I},$$

where $m_P$ is the linear density of the conduit (e.g., pipe) and $m_F$ is the linear density of the fluid. The linear density of the conduit can be determined by solving the following equation for $m_P$: $m_P = \pi (b^2 - a^2) \rho_P$. The linear density of the conduit can be determined by solving the following equation for $m_F$: $m_F = \pi a^2 \rho_F$.

Figure 1A:
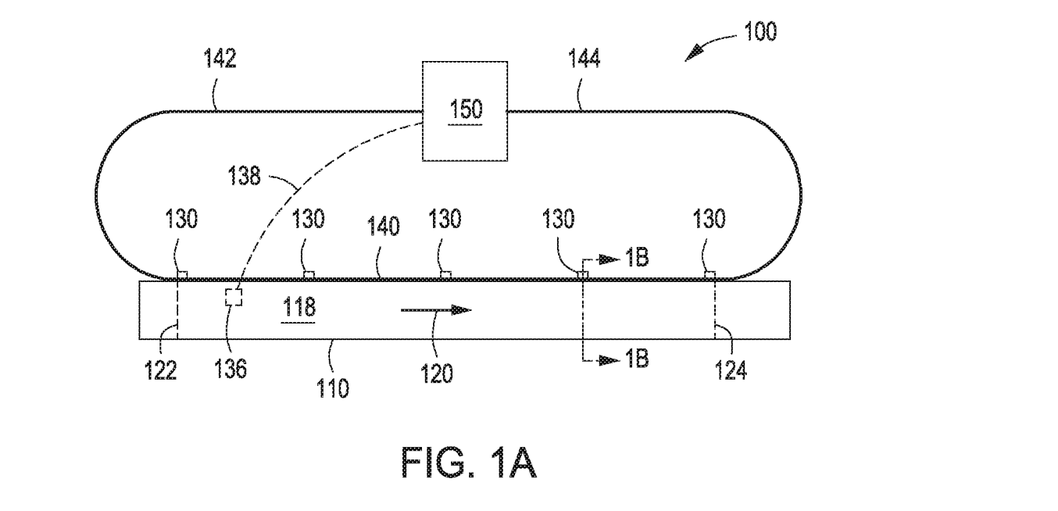
FIG. 1A depicts a schematic view of a distributed acoustic sensing system that can be used for determining the density of a fluid passing within a conduit, according to one or more embodiments.
Figure 1B:
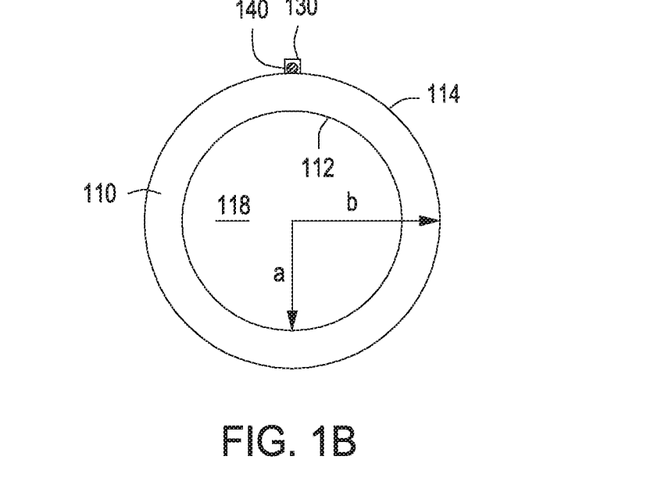
FIG. 1B depicts a sectional view of the conduit and the fiber optic cable at line 1B-1B illustrated in FIG. 1A.

FIG. 1A depicts a schematic view of a distributed acoustic sensing system 100 that can be used for determining the density of a fluid, according to one or more embodiments. The system 100 can include a conduit 110 having an outer surface 114 opposite an inner surface 112, as depicted in FIG. 1B. The inner surface 112 can define a channel 118 extending along a length of the conduit 110. The inner surface 112 of the conduit 110 can define a passageway or channel 118 extending along a length of the conduit 110. Also depicted in FIG. 1B, the conduit 110 can have an inner radius "α" extending from the diameter of the conduit 110 to the inner surface 112 and an outer surface "b" extending from the diameter of the conduit 110 to the outer surface 114. The conduit 110 can be or include, but is not limited to, one or more pipes, pipelines, ducts, tubes, tubings, casings, casing string, lines, slicklines, or any combinations thereof.

The conduit 110 can include one or more fluids (illustrated as arrow 120 in FIG. 1A) contained within the channel 118 and the fluid 120 can be passed or otherwise flowed through the channel 118 in the conduit 110 when determining the fluid density. In one or more examples, the fluid 120 can include or otherwise contain one or more solids, such as a plurality of particles, disposed or otherwise contained in one or more liquids, one or more gases, or a mixture thereof. The fluid 120 can be or include, but is not limited to, one or more fracking fluids, cement slurries, muds, drilling fluids, or other oil and/or gas field fluids, one or more mining fluids, one or more slurries, one or more suspensions, one or more flocculations, one or more coagulations, one or more portions thereof, or any mixture thereof. The liquid portion of the fluid 120 can be or include, but is not limited to, water, one or more organic solvents, and/or one or more dissolved materials. The solid portion or undissolved portion of the fluid 120 can be or include, but is not limited to, particles, colloids, flocculants, chips, flakes, or any mixture thereof. For example, the solid portion of the fluid 120, including the plurality of particles, can be or include, but is not limited to, sand, silica, alumina, carbonate, gravel, whole and/or crushed nuts, shells, and/or seeds, proppants, or any mixture thereof. In other examples, the fluid 120 can be or include one or more food products, one or more chemical processing fluids, one or more waste fluids (e.g., treated or untreated sewage), one or more portions thereof, or any mixture thereof.

One or more fiber optic cables 140 (one fiber optic cable 140 is depicted in FIGS. 1A and 1B) can be coupled to or otherwise disposed on the outer surface 114 of the conduit 110 and can be extended along at least a portion of the length of the conduit 110. In other example, not shown, the fiber optic cable can be coupled to or otherwise disposed on the inner surface 112 of the conduit 110 and can be extended along at least a portion of the length of the conduit 110. The fiber optic cable 140 can be or include, but is not limited to, one or more optic fibers, slicklines, rods, fiber cables, or any combination thereof. The fiber optic cable 140 can be coupled to the inner surface 112 and/or the outer surface 114 of the conduit 110 by one, two, or more fasteners 130 (five fasteners 130 are shown in FIG. 1A). In one or more examples, the fiber optic cable 140 can be coupled to the inner surface 112 and/or the outer surface 114 by at least two fasteners 130. Illustrative fasteners 130 can be or include, but are not limited to, one or more clamps, braces, brackets, bands, couplings, bolts, screws, bonding agents, or any combination thereof. In other examples, the fiber optic cable 140 can be coupled to the inner surface 112 and/or the outer surface 114 of the conduit 110 by one or more bonding agents (not shown). Illustrative bonding agents can be or include, but are not limited to, one or more adhesives, glues, epoxies, resins, or any mixture thereof.

A first portion 142 and a second portion 144 of the fiber optic cable 140 can independently be coupled to and operatively connected to a distributed sensing unit 150, as depicted in FIG. 1A. The first portion 142 and the second portion 144 are portions of the fiber optic cable 140 that can be unattached to the inner or outer surface 112, 114 of the conduit 110. The distributed sensing unit 150 can be coupled with the fiber optic cable 140 and can be configured to measure one or more vibrations and/or one or more temperatures of the conduit 110. The distributed sensing unit 150 can generate one or more vibrational or acoustical signals indicative of the vibration and/or one or more temperature signals indicative of the temperature. The distributed sensing unit 150 can also generate one or more pressure signals indicative of the pressure within the conduit 110 and one or more acceleration signals indicative of the acceleration of the fluid. The distributed sensing unit 150 can be or include, but is not limited to, one or more signal interrogation units or systems (including one or more DAS units and/or one or more DTS units), one or more control systems, one or more computer systems, one or more communication systems, or any combinations thereof. Exemplary DAS and/or DTS units can be or include an optical phase demodulator DAS/DTS unit, which can be used to measure vibrational/acoustical, temperature, pressure, and acceleration.

In one or more embodiments, the fiber optic cable 140 can form a loop with the distributed sensing unit 150 via the first portion 142 and the second portion 144. A light source within the distributed sensing unit 150 can emit or reflect light through the first portion 142, through the segment of the fiber optic cable 140 coupled to the conduit 110, through the second portion 144, and back to the distributed sensing unit 150. In other embodiments, not shown, the first portion 142 of the fiber optic cable 140 can be coupled to and operatively connected to the distributed sensing unit 150. A light source (not shown) can emit or reflect light can be from the opposite end of the fiber optic cable 140 than where the distributed sensing unit 150 is coupled thereto.

The fiber optic cable 140 can be coupled to the inner or outer surface 112, 114 of the conduit 110 between a first circumference or point 122 and a second circumference or point 124 along at least a portion of the length of the conduit 110. In one or more examples, as depicted in FIGS. 1A and 1B, the first point 122 can be disposed upstream of the second point 124. The fluid 120 can travel or pass through the channel 118 under the fiber optic cable 140 between the first and second points 122, 124. The fluid 120 can produce at least portion of the vibration of the conduit 110 and/or can transfer at least portion of the thermal energy to the conduit 110 to provide the temperature of the conduit 110.

At least a portion of the vibration of the conduit 110 can be produced by the fluid 120 passing through the conduit 110 via the channel 118. For example, all or substantially all of the vibration of the conduit 110 can be produced by fluid vibrations, that is, the fluid 120 passing through the conduit 110. In other examples, at least a portion of the vibration of the conduit 110 can be produced by one or more vibration units that include one or more vibration sources and one or more vibration detectors or sensors (not shown). The vibration of the conduit 110 can be a combined vibration produced by both the fluid 120 passing through the conduit 110 and an external vibrational source. For example, a first portion of the vibration of the conduit 110 can be produced by the fluid 120 passing through the conduit 110 via the channel 118 and a second portion of the vibration of the conduit 110 can be produced by the vibration unit (not shown). An exemplary vibrational source can be the electrodynamic shaker model VR5200HF, commercially available from Vibration Research Corporation. Exemplary vibration detectors or sensors can include, but are not limited to, one or more of accelerometers, strain gauges, voice-coils, or any combination thereof.

In one or more embodiments, the distributed sensing unit 150 can be configured to measure one or more temperatures of the conduit 110 and to generate a temperature signal indicative of the temperature. The distributed sensing unit 150 can be configured to calculate a density of the fluid 120 passing through the conduit 110 via the channel 118 by using the vibrational signal and the temperature signal. The vibration of the conduit 110 can be produced by the fluid 120 passing through the conduit 110 via the channel 118. The temperature of the conduit 110 can be generated, produced, or otherwise reached by transferring at least a portion of the heat or thermal energy contained in the fluid 120 that passes through the channel 118 to the outer surface 114 of the conduit 110. The conduit 110 can absorb at least a portion of the thermal energy contained in the fluid 120. The conduct 110 can also be heated by absorbing at least a portion of the heat or thermal energy contained in surrounding environment (e.g., ground, air, and/or water) via the outer surface 114 of the conduit 110. In one or more examples, the temperature of the conduit 110 and the temperature of the fluid 120 passing therethrough can be the same temperature or substantially the same temperature.

In one or more embodiments, the temperature of the conduit 110 can be measured by distributed temperature sensing via the fiber optic cable 140 coupled to the outer surface 114 of the conduit 110. In other embodiments, the temperature of the conduit 110 can optionally be measured by single-point temperature sensing via one or more temperature sensor units 136. For example, the temperature sensor unit 136 can be coupled to the outer surface 114 of the conduit 110 or can be at least partially disposed in the channel 118 of the conduit 110, such as protruding through the conduit 110 and into the channel 118. One or more cables 138 can be coupled to and in operative communication with each temperature sensor unit 136 and the distributed sensing unit 150. In one or more examples, the fluid 120 passing through the conduit 110 via the channel 118 can contain thermal energy and the conduit 110, including the outer surface 114, can be heated to the temperature by absorbing at least a portion of the thermal energy. Examples of point temperature sensors can be or include Type J Iron-Constantan thermocouple model DH-1-8-J-12 and the PT-100 RTD sensor model RTD-2-F3102-36-T-B, both commercially available from Omega.

The frequency and mode shape of the vibration depends on the density $\rho_F$ of the fluid inside the conduit, the dimensions of the conduit, the density of the conduit, and the temperature dependent Young's modulus E(T) of the conduit. By analyzing the DAS data in both time and space domains, one can determine fluid density.

From Euler's beam theory, the transverse vibration of a conduit carrying fluid can be determined by the following differential equation:

$$E(T)I\frac{\partial^4 y(x,t)}{\partial x^4} + (m_P + m_F)\frac{\partial^2 y(x,t)}{\partial t^2} = 0,$$

where the linear density of the conduit can be determined by $m_P=\pi(b^2-a^2)\rho_P$ and the linear density of the fluid can be determined by $m_F=\pi a^2 \rho_F$. The area moment of inertia of the conduit can be determined by $$I = \frac{\pi}{4}(b^4 - a^4).$$

and the transverse displacement of the conduit at position x at time t can be determined by y(x, t).

A separation of the temporal and spatial variables is assumed and a time harmonic solution can be determined by $\exp(i\omega t)$, where $\omega=2\pi f$, and f is the conduit vibration frequency. The general solution of the differential equation in the spatial variable can be determined by:

$$y(x)=c_1 \sin(\beta x)+c_2 \cos(\beta x)+c_3 \sin h(\beta x)+c_4 \cos h(\beta x)$$

where $$\beta^4 = \frac{(m_P + m_F)\omega^2}{E(T)I}.$$

The value of β can be determined by boundary conditions on the conduit. For example, for simply supported conduit at two ends, such as at the first and second points 122, 124. The characteristic equation for β is $\cos(\beta L)\cos h(\beta L)=1$, where L is the distance between the nodes of the first mode obtained from DAS data. The value of β can be determined via standard numerical algorithms for root-finding, such as, for example, the secant method.

The Young's modulus E as a function of temperature (T) for the conduit can be determined. As discussed above, in one or more examples, the existing optic fiber cable coupled to the conduit can be used to determine the temperature of the conduit by DTS. Alternatively, one or more temperature sensors attached to the section of the conduit can be used to determine the temperature of the conduit.

The functional form of E(T) can be predetermined and stored as a look-up table, or it can be reduced into analytic form using nonlinear curve fitting routines or algorithms with a modeling engine. One such modeling system can be an artificial intelligence-powered modeling system, such as the EUREQA® modeling system, commercially available from Nutonian, Inc.

Thereafter, the model can include solving the following equation for the density of the fluid ($\rho_F$):

$$\rho_F = \frac{E(T)I\beta^4}{\pi a^2 \omega^2} - \frac{b^2 - a^2}{a^2}\rho_P.$$

In one or more embodiments, a method for determining the density of the fluid can include flowing the fluid through the channel in the conduit and measuring the vibration of the conduit by distributed acoustic sensing via the fiber optic cable coupled to the outer surface of the conduit and generating the vibrational signal. The method can also include measuring the temperature of the outer surface of the conduit by distributed temperature sensing via the fiber optic cable and generating the temperature signal indicative of the measured temperature. The method can also include adjusting a model of the conduit using the vibrational signal and the temperature signal. At the time the density of the fluid is to be determined, the fluid can be flowed through the channel, the vibration of the conduit can be measured, the temperature of the outer surface of the conduit can be measured, and/or the model of the conduit can be adjusted.

The method can also include calculating the density of the fluid passing through the channel by using the vibrational signal and the temperature signal in the model, wherein the model includes solving the following equation for $\rho_F$:

$$\rho_F = \frac{E(T)I\beta^4}{\pi a^2 \omega^2} - \frac{b^2 - a^2}{a^2}\rho_P,$$

where $\rho_F$ is the density of the fluid; $\rho_P$ is the density of the conduit material; a is the inner radii of the conduit; b is the outer radii of the conduit; E(T) is the Young's modulus of the conduit material as a function of the temperature of the conduit; I is the area moment of inertia of the conduit; $\omega$ is the angular frequency of the conduit;

$$\beta^4 = \frac{(m_P + m_F)\omega^2}{E(T)I};$$

$m_P = \pi(b^2 - a^2)\rho_P$ and is the linear density of the conduit; and $m_F = \pi a^2 \rho^F$ and is the linear density of the fluid.

In one or more embodiments, a method for determining the density of the fluid can include flowing the fluid through the channel in the conduit and measuring the vibration of the conduit by DAS via the fiber optic cable coupled to the outer surface of the conduit and generating the vibrational signal indicative of the measured vibration. The vibration of the conduit can be produced by the fluid passed through the channel between a first point and a second point (e.g., such as the points 122, 124 depicted in FIG. 1A) along a portion of the length of the conduit. The fiber optic cable can be coupled to the outer surface of the conduit between the first and second points. The method can also include measuring a temperature of the conduit by distributed temperature sensing via the fiber optic cable and generating the temperature signal indicative of the measured temperature. The fluid passed through the channel between the first and second points can contain thermal energy, and the outer surface of the conduit can be heated to the measured temperature by absorbing at least a portion of the thermal energy. At the time the density of the fluid is to be determined, the fluid can be flowed through the channel between the first and second points, the vibration of the conduit can be measured, and/or the temperature of the outer surface of the conduit can be measured. The method can include calculating the density of the fluid passed through the channel between the first and second points by using the vibrational signal and the temperature signal.

Figures 2, 3:
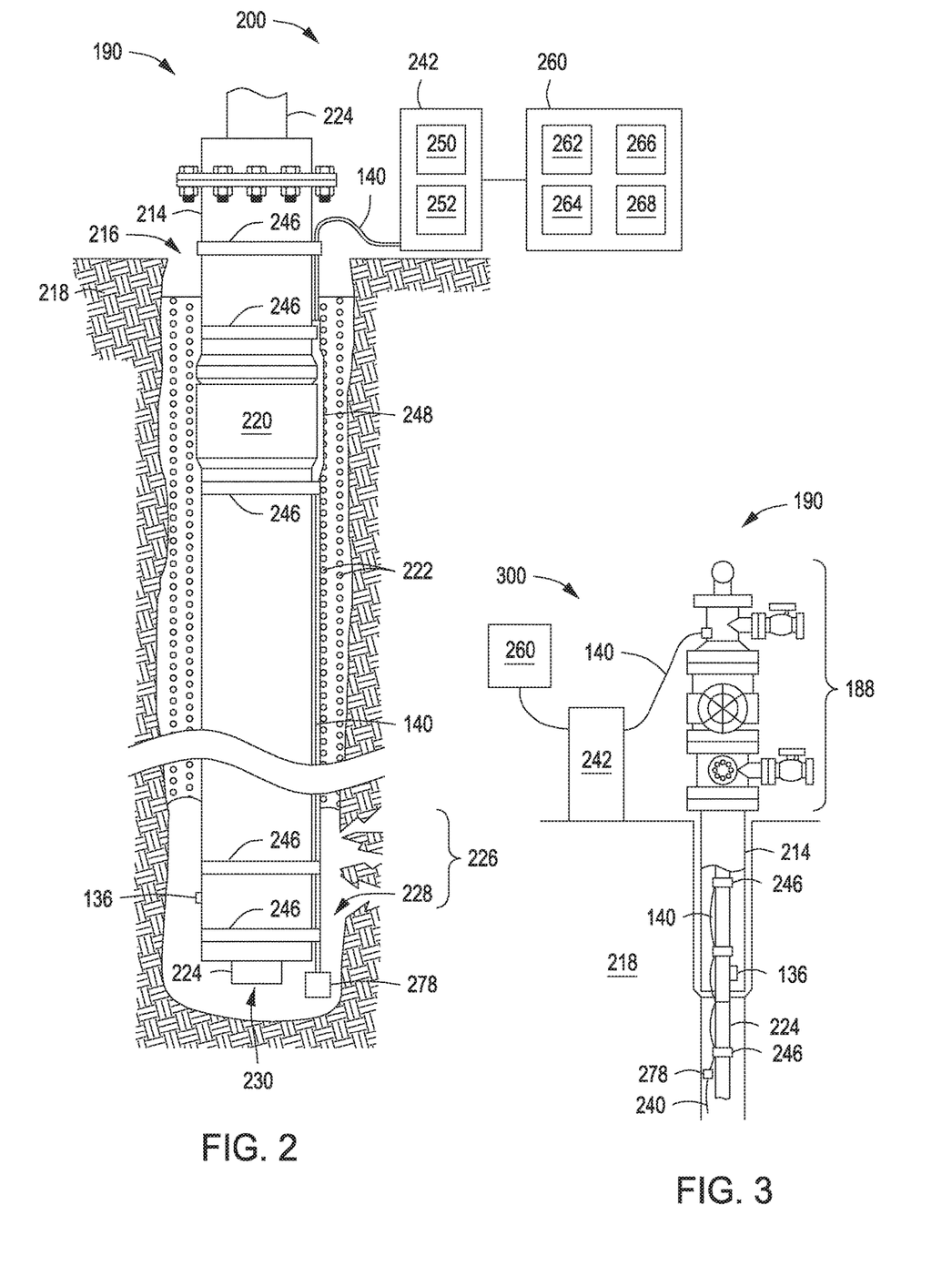
FIG. 2 depicts a schematic view of another distributed acoustic sensing system that includes a fiber optic cable coupled to a casing of a well, according to one or more embodiments.
FIG. 3 depicts a schematic view of a distributed acoustic sensing system that includes a fiber optic cable coupled to a tubing positioned within a well, according to one or more embodiments.

FIG. 2 depicts a schematic view of a distributed acoustic sensing system 200 deployed downhole as permanent installation within a well 190, according to one or more embodiments. The distributed acoustic sensing system 200 includes the fiber optic cable 110 coupled to a casing string 214 positioned within the well 190. As shown, the well 190 is constructed and completed and includes the casing string 214 positioned in a borehole 216 that has been formed in a subterranean earth formation 218. The casing string 214 includes multiple tubular casing sections (usually about 30 feet (about 9 meters) in length) connected end-to-end by one or more couplings 220. Within the well 190, cement 222 is injected between an outer surface of the casing string 214 and an inner surface of the borehole 216 and allowed to set. A production string or production tubing 224 is positioned in an inner bore of the casing string 214.

Figure 4:
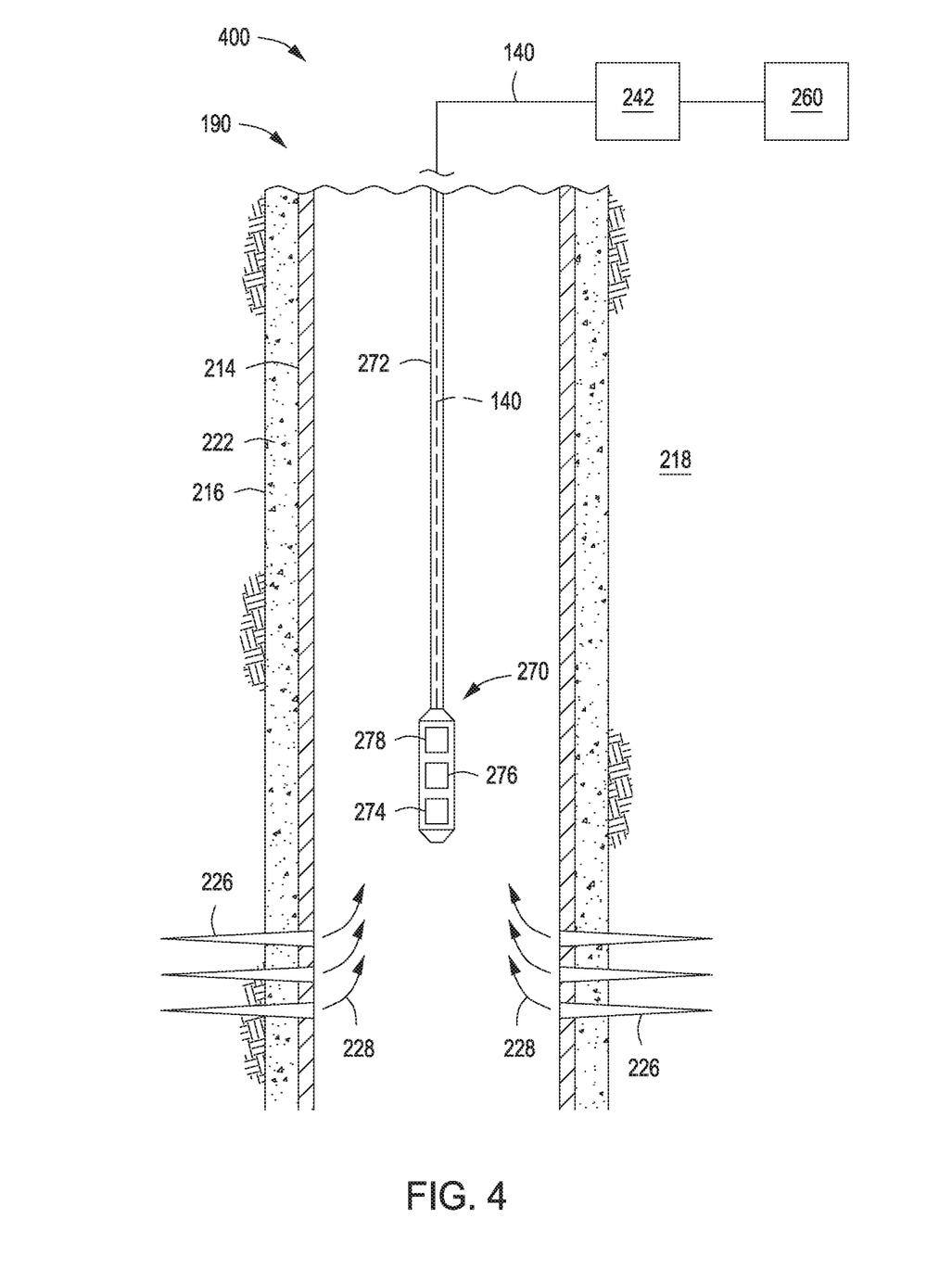
FIG. 4 depicts a schematic view of another distributed acoustic sensing system that includes a fiber optic cable located in a conveyance string positioned within a well, according to one or more embodiments.

The well 190 is configured to guide one or more fluids (e.g., oil, gas, or water) from a bottom of the borehole 216 to a surface of the earth or the subterranean earth formation 218. Perforations 226 have been formed at a subterranean location of the borehole 216 to facilitate the flow of one or more fluids 228 from a surrounding formation into the borehole 216 and to the surface via one or more openings 230 at the bottom of the production tubing 224. The configuration of the well 190 as depicted in FIGS. 2-4 is illustrative and not limiting on the scope of the disclosure.

The distributed acoustic sensing system 200 includes an interrogator 242 coupled to the fiber optic cable 140 locatable in the well 190. The fiber optic cable 140 extends along an outer surface of the casing string 214 and is held against the outer surface of the casing string 214 at spaced apart locations by one or more fasteners 246 that extend around the casing string 214. Illustrative fasteners 246 can be or include, but are not limited to, one or more clamps, braces, brackets, bands, couplings, bolts, screws, bonding agents, or any combination thereof. Optionally, a protective covering 248 is installed over the fiber optic cable 140 at the coupling 220 of the casing string 214 and is held in place by two of the fasteners 246 installed on either side of the coupling 220. The protective covering 248 may be installed over the fiber optic cable 140 at each of the couplings 220 to prevent the fiber optic cable 140 from being pinched or sheared between the coupling 220 and the borehole 216. It should be appreciated that, in downhole applications, the fiber optic cable 140 can be connected to the production tubing 224 (e.g., a coiled tubing or a fiber optic slickline). The fiber optic cable 140 can be deployed on the surface to generate distributed sensing measurements and is not limited to downhole applications.

The fiber optic cable 140 terminates at the interrogator 242 with a port adapted for coupling the fiber optic cable 140 to a transmitter 250 and a receiver 252. The transmitter 250 transmits light or other EM pulses along the fiber optic cable 140, which has scattering impurities. As a pulse of light propagates along the fiber optic cable 140, reflections of the pulse scatter back along the fiber optic cable 140 to the interrogator 242. The receiver 252 is responsive to the backscattered reflections, and as will be explained in greater detail below, the receiver 252 produces measurements of differences in phase of the backscattered reflections at channels on the fiber optic cable 140.

The distributed acoustic sensing system 200 can also include one or more temperature sensor units 136. For example, the temperature of the casing string 214 and/the production tubing 224 can optionally be measured by single-point temperature sensing via one or more temperature sensor units 136 located thereon.

The distributed acoustic sensing system 200 also includes a computer 260 in communication with the interrogator 242 to control the transmitter 250 and the receiver 252. The computer 260 includes a processor 262, an output device 264 (e.g., a monitor, a screen, and/or a printer), an input device 266 (e.g., a keyboard, a touchpad, and/or a mouse), and a non-transitory machine-readable storage media 68 (e.g., ROM, EPROM, EEPROM, flash memory, RAM, a hard drive, a solid state disk, an optical disk, or a combination thereof). However, the computer 260 may be implemented in different forms including, but not limited to, an embedded processor installed as part of the interrogator 242, a portable computer that communicates with the interrogator 242 as desired to collect data, and a remote desktop computer in communication with the interrogator 242 via a wireless link and/or a wired computer network. The computer 260 is adapted to receive the measurement signals produced by the interrogator 242 and to responsively determine a distributed parameter such as, e.g., distributed acoustic parameters along the length of the fiber optic cable 140. As used herein, the term processor is intended to include devices such as a field programmable gate array (FPGA).

For example, the non-transitory storage media 268 may store a software program for execution by the processor 262. The instructions of the software program may cause the computer 260 to collect phase differences of back-scattered reflections derived from the interrogator 242 and, based at least in part thereon, to determine downhole parameters such as acoustic signals along the length of the fiber optic cable 140. The instructions of the software program may also cause the computer 260 to display the acoustic waveforms or envelopes associated with each point on the fiber optic cable 140 via the output device 264.

FIG. 3 depicts a schematic view of a distributed acoustic sensing system 300 deployed downhole as permanent installation within the well 190, according to one or more embodiments. The distributed acoustic sensing system 300 includes the fiber optic cable 110 coupled to an outer surface of a production tubing 224 positioned within the well 190, rather than the outside of the casing or the casing string 214, as in distributed acoustic sensing system 200. Rather than exiting the well 190 from the annular space outside the casing, the fiber optic cable 140 exits through an appropriate port in the "Christmas tree" 188, e.g., the assembly of pipes, valves, spools, and fittings connected to the top of the well to direct and control the flow of fluids to and from the well. The fiber optic cable 140 extends along the outer surface of the production tubing 224 and is held against the outer surface of the production tubing 224 at spaced apart locations by multiple fasteners 246 that extend around the production tubing 224. The distributed acoustic sensing system 300 can optionally include a hanging tail 240 at the bottom of a borehole 216. The fiber optic cable 140 may also be suspended inside the production tubing 224 or the borehole 216 and held in place by a suspended weight on the end of the fiber optic cable 140.

FIG. 4 shows a schematic view of a distributed acoustic sensing system 400 retrievably deployed downhole via a conveyance string 272, in accordance with one or more embodiments. Rather than a permanent installation, as in the distributed acoustic sensing systems 200, 300, the fiber optic cable 140 is retrievably suspended in the borehole 216 by the conveyance string 272. A well logging assembly 270 may also be attached to the conveyance string 272 and conveyed in the borehole 216. The well logging assembly 270 may include one or more logging tools, including but not limited to, a casing collar locator 274, a gamma ray tool 276, and one or more sensors 278 (e.g., a pressure sensor and/or a temperature sensor). However, it should be appreciated that instead of using the well logging assembly 270, a weight may be attached to lower the conveyance string 272 into the borehole 216. The conveyance string 272 and the fiber optic cable 140 may also be suspended in the production tubing 224 of the distributed acoustic sensing systems 200, 300.

The conveyance string 272 may be in the form of a cable with suitable strength, temperature resistance, corrosion resistance, and protection for the fiber optic cable 140. The cable may comprise stranded cable or cable made from metal tubing or control line, with the fiber optic cable 140 inside the line. The conveyance string 272 may be in the form of a coiled tubing string (e.g., a substantially continuous tubular string, stored on a reel or drum), with the fiber optic cable 140 positioned inside, in a wall of, and/or exterior to, the coiled tubing. The scope of this disclosure is not limited to any particular form of the conveyance string 272, or to any particular position of the fiber optic cable 140 with respect to the conveyance string 272.

The distributed acoustic sensing systems 100, 200, 300, 400 are suitable for determining the density and other properties of one or more fluids, monitoring production in a well, monitoring treatment operations, cementing operations, performing active and passive seismic surveys, monitoring field activity, or any combination thereof.

In addition to the embodiments described above, embodiments of the present disclosure further relate to one or more of the following paragraphs:

1. A method for determining a density of a fluid, comprising: flowing the fluid through a conduit, wherein the fluid comprises a plurality of particles disposed in a liquid, a gas, or a mixture thereof; measuring a vibration of the conduit by distributed acoustic sensing via a fiber optic cable coupled to the conduit and generating a vibrational signal indicative of the vibration, wherein at least a portion of the vibration of the conduit is produced by the fluid passing through the conduit; measuring a temperature of the conduit and generating a temperature signal indicative of the temperature; and calculating the density of the fluid passing through the conduit by using the vibrational signal and the temperature signal.

2. A method for determining a density of a fluid, comprising: flowing the fluid through a channel in a conduit having an outer surface opposite an inner surface, wherein the fluid comprises a plurality of particles disposed in a liquid, a gas, or a mixture thereof, and wherein the inner surface defines the channel extending along a length of the conduit; measuring a vibration of the conduit by distributed acoustic sensing via a fiber optic cable coupled to the conduit and generating a vibrational signal indicative of the vibration, wherein at least a portion of the vibration of the conduit is produced by the fluid passing through the channel; measuring a temperature of the conduit and generating a temperature signal indicative of the temperature; and calculating the density of the fluid passing through the channel by using the vibrational signal and the temperature signal.

3. A method for determining a density of a fluid, comprising: flowing, at a time the density of the fluid is to be determined, the fluid through a channel in a conduit having an outer surface opposite an inner surface, wherein the fluid comprises a plurality of particles disposed in a liquid, a gas, or a mixture thereof, and wherein the inner surface defines the channel extending along a length of the conduit; measuring, at the time the density of the fluid is to be determined, a vibration of the conduit by distributed acoustic sensing via a fiber optic cable coupled to the conduit and generating a vibrational signal indicative of the vibration, wherein at least a portion of the vibration of the conduit is produced by the fluid passing through the channel; measuring, at the time the density of the fluid is to be determined, a temperature of the conduit and generating a temperature signal indicative of the temperature; and calculating the density of the fluid passing through the channel by using the vibrational signal and the temperature signal.

4. A method for determining a density of a fluid, comprising: flowing, at a time the density of the fluid is to be determined, the fluid through a channel in a conduit having an outer surface opposite an inner surface, wherein the fluid comprises a plurality of particles disposed in a liquid, a gas, or a mixture thereof, and wherein the inner surface defines the channel extending along a length of the conduit; measuring, at the time the density of the fluid is to be determined, a vibration of the conduit by distributed acoustic sensing via a fiber optic cable coupled to the outer surface of the conduit and generating a vibrational signal indicative of the vibration, wherein the vibration of the conduit is produced by the fluid passing through the channel between a first point and a second point along a portion of the length of the conduit, and wherein the fiber optic cable is coupled to the outer surface of the conduit between the first and second points; measuring, at the time the density of the fluid is to be determined, a temperature of the conduit by distributed temperature sensing via the fiber optic cable and generating a temperature signal indicative of the temperature, wherein the fluid passing through the channel between the first and second points comprises thermal energy, and wherein the outer surface of the conduit is heated to the temperature by absorbing at least a portion of the thermal energy; and calculating the density of the fluid passing through the channel between the first and second points by using the vibrational signal and the temperature signal.

5. A method for determining a density of a fluid, comprising: flowing, at a time the density of the fluid is to be determined, the fluid through a conduit having an outer surface, wherein the fluid comprises a plurality of particles disposed in a liquid, a gas, or a mixture thereof, measuring, at the time the density of the fluid is to be determined, a vibration of the conduit by distributed acoustic sensing via a fiber optic cable coupled to the outer surface of the conduit and generating a vibrational signal indicative of the vibration, wherein at least a portion of the vibration of the conduit is produced by the fluid passing through the conduit; measuring, at the time the density of the fluid is to be determined, a temperature of the outer surface of the conduit by distributed temperature sensing via the fiber optic cable and generating a temperature signal indicative of the temperature; adjusting, at the time the density of the fluid is to be determined, a model of the conduit using the vibrational signal and the temperature signal; and calculating the density of the fluid passing through the conduit by using the vibrational signal and the temperature signal in the model, wherein the model comprises solving the following equation for $\rho_F$:

$$\rho_F = \frac{E(T)I\beta^4}{\pi a^2 \omega^2} - \frac{b^2 - a^2}{a^2}\rho_P,$$

wherein: $\rho_F$ is the density of the fluid; $\rho_P$ is the density of the conduit material; a is the inner radii of the conduit; b is the outer radii of the conduit; E(T) is the Young's modulus of the conduit material as a function of the temperature of the conduit; I is the area moment of inertia of the conduit; w is the angular frequency of the conduit;

$$\beta^4 = \frac{(m_P + m_F)\omega^2}{E(T)I};$$

$m_P = \pi(b^2 - a^2)\rho_P$ and is the linear density of the conduit; and $m_F = \pi a^2 \rho_F$ and is the linear density of the fluid.

6. A method for determining a density of a fluid, comprising: flowing, at a time the density of the fluid is to be determined, the fluid through a channel in a conduit having an outer surface opposite an inner surface, wherein the fluid comprises a plurality of particles disposed in a liquid, a gas, or a mixture thereof, and wherein the inner surface defines the channel extending along a length of the conduit; measuring, at the time the density of the fluid is to be determined, a vibration of the conduit by distributed acoustic sensing via a fiber optic cable coupled to the outer surface of the conduit and generating a vibrational signal indicative of the vibration, wherein at least a portion of the vibration of the conduit is produced by the fluid passing through the channel; measuring, at the time the density of the fluid is to be determined, a temperature of the outer surface of the conduit by distributed temperature sensing via the fiber optic cable and generating a temperature signal indicative of the temperature; adjusting, at the time the density of the fluid is to be determined, a model of the conduit using the vibrational signal and the temperature signal; and calculating the density of the fluid passing through the channel by using the vibrational signal and the temperature signal in the model, wherein the model comprises solving the following equation for $\rho_F$:

$$\rho_F = \frac{E(T)I\beta^4}{\pi a^2 \omega^2} - \frac{b^2 - a^2}{a^2}\rho_P,$$

wherein: $\rho_F$ is the density of the fluid; $\rho_P$ is the density of the conduit material; $\alpha$ is the inner radii of the conduit; b is the outer radii of the conduit; E(T) is the Young's modulus of the conduit material as a function of the temperature of the conduit; I is the area moment of inertia of the conduit; $\omega$ is the angular frequency of the conduit;

$$\beta^4 = \frac{(m_P + m_F)\omega^2}{E(T)I};$$

$m_P = \pi(b^2 - \alpha^2)\rho_P$ and is the linear density of the conduit; and $m_F = \pi \alpha^2 \rho_F$ and is the linear density of the fluid.

7. The method according to any one of paragraphs 1-4, further comprising adjusting, at the time the density of the fluid is to be determined, a model of the conduit using the vibrational signal and the temperature signal to calculate the density of the fluid passing through the channel.

8. The method according to paragraph 7, further comprising calculating a Young's modulus of a conduit material contained in the conduit to adjust the model of the conduit.

9. The method according to paragraph 8, wherein the model comprises solving the following equation for $\rho_F$:

$$\rho_F = \frac{E(T)I\beta^4}{\pi a^2 \omega^2} - \frac{b^2 - a^2}{a^2}\rho_P,$$

wherein: $\rho_F$ is the density of the fluid; $\rho_P$ is the density of the conduit material; a is the inner radii of the conduit; b is the outer radii of the conduit; E(T) is the Young's modulus of the conduit material as a function of the temperature of the conduit; I is the area moment of inertia of the conduit; $\omega$ is the angular frequency of the conduit; and $\beta$ is a variable of the boundary conditions of the conduit.

10. The method according to paragraph 9, wherein the model further comprises solving the following equation for $\beta^4$:

$$\beta^4 = \frac{(m_P + m_F)\omega^2}{E(T)I},$$

wherein: $m_P=\pi(b^2-\alpha^2)\rho_P$ and is the linear density of the conduit; and $m_F=\pi\alpha^2\rho_F$ and is the linear density of the fluid.

11. The method according to any one of paragraphs 1-10, wherein the model further comprises solving the following equation for β: cos(βL)cos h(βL)=1, wherein L is the distance between the nodes of the first mode derived from the distributed acoustic sensing.

12. The method according to any one of paragraphs 1-11, wherein the fiber optic cable is coupled to an outer surface of the conduit.

13. The method according to any one of paragraphs 1-11, wherein the fiber optic cable is coupled to an inner surface of the conduit.

14. The method according to any one of paragraphs 1-13, wherein the fiber optic cable is coupled to the outer surface of the conduit by at least two fasteners.

15. The method according to any one of paragraphs 1-14, wherein the fiber optic cable is coupled to the outer surface of the conduit by a bonding agent comprising an adhesive, a glue, an epoxy, or any mixture thereof.

16. The method according to any one of paragraphs 1-15, wherein the fluid passing through the channel comprises thermal energy, and wherein the conduit is heated to the temperature by absorbing at least a portion of the thermal energy.

17. The method according to any one of paragraphs 1-16, wherein the temperature of the conduit is measured by distributed temperature sensing via the fiber optic cable coupled to the outer surface of the conduit.

18. The method according to any one of paragraphs 1-17, wherein the temperature of the conduit is measured by single-point temperature sensing via a temperature sensor unit.

19. The method according to paragraph 18, wherein the temperature sensor unit is coupled to the outer surface of the conduit or is at least partially disposed in the channel of the conduit.

20. The method according to any one of paragraphs 1-19, wherein at least another portion of the vibration of the conduit is produced a vibration unit coupled to the conduit.

21. The method according to any one of paragraphs 1-20, wherein the fiber optic cable is coupled to the outer surface of the conduit between a first point and a second point along at least a portion of the length of the conduit, wherein the fluid passes through the channel under the fiber optic cable between the first and second points, and wherein the fluid produces the at least portion of the vibration of the conduit and transfers the at least portion of the thermal energy to the conduit.

22. The method according to paragraph 21, wherein the first point is upstream of the second point.

23. The method according to any one of paragraphs 1-22, wherein the fiber optic cable is coupled to and operatively connected to an acoustic sensing unit.

24. The method according to any one of paragraphs 1-23, wherein the fluid comprises a fracking fluid, a cement slurry, a mud, a drilling fluid, a food product or portion thereof, or any mixture thereof.

25. The method according to any one of paragraphs 1-24, wherein the plurality of particles comprises sand, silica, alumina, gravel, proppants, or any mixture thereof.

26. The method according to any one of paragraphs 1-25, wherein the fluid passing through the channel comprises thermal energy, and wherein the outer surface of the conduit is heated to the temperature by absorbing at least a portion of the thermal energy.

27. The method according to any one of paragraphs 1-26, wherein greater than 50% of the vibration of the conduit is produced by the fluid passing through the channel, wherein the fluid comprises a fracking fluid, a cement slurry, a mud, a drilling fluid, a food product or portion thereof, or any mixture thereof, and wherein the plurality of particles comprises sand, silica, alumina, gravel, proppants, or any mixture thereof.

28. A system for determining fluid density, comprising: a conduit having an outer surface opposite an inner surface, wherein the inner surface defines a channel extending along a length of the conduit; a fluid contained within the channel and comprising a plurality of particles disposed in a liquid, a gas, or a mixture thereof; a fiber optic cable coupled to the outer surface of the conduit and extending along at least a portion of the length of the conduit; and a distributed sensing unit coupled with the fiber optic cable, configured to calculate a density of the fluid passing through the channel by the method according to any one of paragraphs 1-27.

29. A system for determining fluid density, comprising: a conduit having an outer surface opposite an inner surface, wherein the inner surface defines a channel extending along a length of the conduit; a fluid contained within the channel and comprising a plurality of particles disposed in a liquid, a gas, or a mixture thereof; a fiber optic cable coupled to the conduit and extending along at least a portion of the length of the conduit; and a distributed sensing unit coupled with the fiber optic cable, configured to measure a vibration of the conduit and to generate a vibrational signal indicative of the vibration and configured to calculate a density of the fluid passing through the channel by using at least the vibrational signal, wherein the vibration of the conduit is produced by the fluid passing through the channel.

30. A system for determining fluid density, comprising: a conduit having an outer surface opposite an inner surface, wherein the inner surface defines a channel extending along a length of the conduit; a fluid contained within the channel and comprising a plurality of particles disposed in a liquid, a gas, or a mixture thereof; a fiber optic cable coupled to the conduit and extending along at least a portion of the length of the conduit; and a distributed sensing unit coupled with the fiber optic cable, configured to measure a vibration of the conduit and to generate a vibrational signal indicative of the vibration, configured to measure a temperature of the conduit and to generate a temperature signal indicative of the temperature, and configured to calculate a density of the fluid passing through the channel by using the vibrational signal and the temperature signal, wherein the vibration of the conduit is produced by the fluid passing through the channel, wherein the fluid passing through the channel comprises thermal energy, and wherein the outer surface of the conduit is heated to the temperature by absorbing at least a portion of the thermal energy.

31. A system for determining fluid density, comprising: a conduit having an outer surface opposite an inner surface, wherein the inner surface defines a channel extending along a length of the conduit; a fluid contained within the channel and comprising a plurality of particles disposed in a liquid, a gas, or a mixture thereof, a fiber optic cable coupled to the outer surface of the conduit and extending along at least a portion of the length of the conduit; and a distributed sensing unit coupled with the fiber optic cable, configured to measure a vibration of the conduit and to generate a vibrational signal indicative of the vibration and configured to calculate a density of the fluid passing through the channel by using at least the vibrational signal, wherein the vibration of the conduit is produced by the fluid passing through the channel.

32. A system for determining fluid density, comprising: a conduit having an outer surface opposite an inner surface, wherein the inner surface defines a channel extending along a length of the conduit; a fluid contained within the channel and comprising a plurality of particles disposed in a liquid, a gas, or a mixture thereof, a fiber optic cable coupled to the outer surface of the conduit and extending along at least a portion of the length of the conduit; and a distributed sensing unit coupled with the fiber optic cable, configured to measure a vibration of the conduit and to generate a vibrational signal indicative of the vibration, configured to measure a temperature of the conduit and to generate a temperature signal indicative of the temperature, and configured to calculate a density of the fluid passing through the channel by using the vibrational signal and the temperature signal, wherein the vibration of the conduit is produced by the fluid passing through the channel, wherein the fluid passing through the channel comprises thermal energy, and wherein the outer surface of the conduit is heated to the temperature by absorbing at least a portion of the thermal energy.

This discussion is directed to various embodiments of the invention. The drawing figures are not necessarily to scale. Certain features of the embodiments can be shown exaggerated in scale or in somewhat schematic form and some details of conventional elements may not be shown in the interest of clarity and conciseness. Although one or more of these embodiments can be preferred, the embodiments disclosed should not be interpreted, or otherwise used, as limiting the scope of the disclosure, including the claims. It is to be fully recognized that the different teachings of the embodiments discussed can be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Within this document, a reference identifier can be used as a general label, for example "101," for a type of element and alternately used to indicate a specific instance or characterization, for example "101A" and 101B," of that same type of element.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. The use of "top," "bottom," "above," "below," and variations of these terms is made for convenience, but does not require any particular orientation of the components.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Reference throughout this specification to "one embodiment," "an embodiment," or similar language means that a particular feature, structure, or characteristic described in connection with the embodiment can be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method for determining a density of a fluid, comprising:
    flowing the fluid through a conduit, wherein the fluid comprises a plurality of particles disposed in a liquid, a gas, or a mixture thereof;
    measuring a vibration of the conduit by distributed acoustic sensing via a fiber optic cable coupled to the conduit and generating a vibrational signal indicative of the vibration, wherein at least a portion of the vibration of the conduit is produced by the fluid passing through the conduit;
    determining a distance between nodes of a first mode of a resonance frequency of the conduit from the measured vibration;
    measuring a temperature of the conduit and generating a temperature signal indicative of the temperature; and
    calculating the density of the fluid passing through the conduit by using the vibrational signal and the temperature signal.

2. The method of claim 1, further comprising adjusting a model of the conduit using the vibrational signal and the temperature signal to calculate the density of the fluid passing through the conduit.

3. The method of claim 2, further comprising calculating a Young's modulus of a conduit material contained in the conduit to adjust the model of the conduit.

4. The method of claim 3, wherein the model comprises solving the following equation for $\rho_F$:

$$\rho_F = \frac{E(T)I\beta^4}{\pi a^2 \omega^2} - \frac{b^2 - a^2}{a^2}\rho_P,$$

wherein:
$\pi_F$ is the density of the fluid;
$\rho_P$ is the density of the conduit material;
$\alpha$ is an inner radii of the conduit;
b is an outer radii of the conduit;
E(T) is the Young's modulus of the conduit material as a function of the temperature of the conduit;
I is the area moment of inertia of the conduit;
$\omega$ is an angular frequency of the conduit; and
$\beta$ is a variable of boundary conditions of the conduit.

5. The method of claim 4, wherein the model further comprises solving the following equation for $\beta^4$:

$$\beta^4 = \frac{(m_P + m_F)\omega^2}{E(T)I},$$

wherein:
$m_p = \pi(b^2 - \alpha^2)\rho_P$, and is a linear density of the conduit; and
$m_F = \pi\alpha^2 \rho_F$ and is a linear density of the fluid.

6. The method of claim 1, wherein the fiber optic cable is coupled to an outer surface of the conduit.

7. The method of claim 6, wherein the fiber optic cable is coupled to the outer surface of the conduit by at least two fasteners.

8. The method of claim 6, wherein the fiber optic cable is coupled to the outer surface of the conduit by a bonding agent comprising an adhesive, a glue, an epoxy, or any mixture thereof.

9. The method of claim 1, wherein the temperature of the conduit is measured by distributed temperature sensing via the fiber optic cable coupled to the conduit.

10. The method of claim 1, wherein the temperature of the conduit is measured by single-point temperature sensing via a temperature sensor unit.

11. The method of claim 10, wherein the temperature sensor unit is coupled to an outer surface of the conduit or is at least partially disposed in a channel of the conduit.

12. The method of claim 1, wherein at least another portion of the vibration of the conduit is produced a vibration unit.

13. The method of claim 1, wherein:
the fiber optic cable is coupled to an outer surface of the conduit between a first point and a second point along at least a portion of a length of the conduit;
the fluid passing through a channel in the conduit under the fiber optic cable between the first and second points;
the fluid produces the at least portion of the vibration of the conduit; and
the fluid comprises thermal energy and the outer surface of the conduit is heated to the temperature by absorbing at least a portion of the thermal energy.

14. The method of claim 1, wherein the fiber optic cable is coupled to and operatively connected to an acoustic sensing unit.

15. The method of claim 1, wherein the fluid comprises a fracking fluid, a cement slurry, a mud, a drilling fluid, a food product or portion thereof, or any mixture thereof.

16. The method of claim 1, wherein the plurality of particles comprises sand, silica, alumina, gravel, proppants, or any mixture thereof.

17. A method for determining a density of a fluid, comprising:
flowing, at a time the density of the fluid is to be determined, the fluid through a conduit having an outer surface, wherein the fluid comprises a plurality of particles disposed in a liquid, a gas, or a mixture thereof;
measuring, at the time the density of the fluid is to be determined, a vibration of the conduit by distributed acoustic sensing via a fiber optic cable coupled to the outer surface of the conduit and generating a vibrational signal indicative of the vibration, wherein at least a portion of the vibration of the conduit is produced by the fluid passing through the conduit;
measuring, at the time the density of the fluid is to be determined, a temperature of the outer surface of the conduit by distributed temperature sensing via the fiber optic cable and generating a temperature signal indicative of the temperature;
adjusting, at the time the density of the fluid is to be determined, a model of the conduit using the vibrational signal and the temperature signal;
calculating the density of the fluid passing through the conduit by using the vibrational signal and the temperature signal in the model; and
wherein the model comprises solving the following equation for $\rho_F$:

$$\rho_F = \frac{E(T)I\beta^4}{\pi a^2 \omega^2} - \frac{b^2 - a^2}{a^2}\rho_P,$$

wherein:
$\rho_F$ is the density of the fluid;
$\rho_P$ is the density of a material of the conduit;
$\alpha$ is an inner radii of the conduit;
b is an outer radii of the conduit;
E(T) is the Young's modulus of the conduit material as a function of the temperature of the conduit;
I is an area moment of inertia of the conduit;
$\omega$ is an angular frequency of the conduit;

$$\beta^4 = \frac{(m_P + m_F)\omega^2}{E(T)I};$$

$m_P = \pi(b^2 - \alpha^2)\rho_P$ and is a linear density of the conduit; and
$m_F = \pi\alpha^2 \rho_F$ and is a linear density of the fluid.

18. The method of claim 17, wherein the fluid passing through the conduit comprises thermal energy, and wherein the outer surface of the conduit is heated to the temperature by absorbing at least a portion of the thermal energy.

19. The method of claim 18, wherein:
greater than 50% of the vibration of the conduit is produced by the fluid passing through the conduit;
the fluid comprises a fracking fluid, a cement slurry, a mud, a drilling fluid, a food product or portion thereof, or any mixture thereof; and
the plurality of particles comprises sand, silica, alumina, gravel, proppants, or any mixture thereof.

20. A system for determining a fluid density, comprising:
a conduit having an outer surface opposite an inner surface, wherein the inner surface defines a channel extending along a length of the conduit;
a fluid contained within the channel and comprising a plurality of particles disposed in a liquid, a gas, or a mixture thereof;
a fiber optic cable coupled to the conduit and extending along at least a portion of the length of the conduit; and
a distributed sensing unit coupled with the fiber optic cable, configured to measure a vibration of the conduit and to generate a vibrational signal indicative of the vibration, to determine a distance between nodes of a first mode of a resonance frequency of the conduit using the vibration signal, to generate a temperature signal indicative of the temperature, and to calculate a density of the fluid passing through the channel by using the vibrational signal and the temperature signal, wherein:
the vibration of the conduit is produced by the fluid passing through the channel;

the fluid passing through the channel comprises thermal energy; and the outer surface of the conduit is heated to the temperature by absorbing at least a portion of the thermal energy.

* * * * *

UNITED STATES PATENT AND TRADEMARK OFFICE
CERTIFICATE OF CORRECTION

PATENT NO. : 10,677,703 B2  
APPLICATION NO. : 16/326965  
DATED : June 9, 2020  
INVENTOR(S) : Gao et al.

Page 1 of 1

It is certified that error appears in the above-identified patent and that said Letters Patent is hereby corrected as shown below:

In the Claims

Column 16, Line 57, (approx.), In Claim No. 4, "$\pi_F$ is the density of the fluid;" should read "$\rho_F$ is the density of the fluid;".

Column 17, Line 8, (approx.), In Claim No. 5, "$m_F = \pi a^2 9 2_F$ and is a linear density of the fluid" should read "$m_F = \pi a^2 \rho_F$ and is a linear density of the fluid".

Signed and Sealed this  
Eighteenth Day of August, 2020

Andrei Iancu  
*Director of the United States Patent and Trademark Office*